United States Patent
Moen et al.

(10) Patent No.: US 9,783,436 B2
(45) Date of Patent: Oct. 10, 2017

(54) METHOD AND SYSTEM FOR PROCESSING A STREAM COMPRISING GLYCOL BASED AND KINETIC HYDRATE INHIBITORS

(71) Applicant: Aker Process Systems AS, Lysaker (NO)

(72) Inventors: Kolbjorn Moen, Oslo (NO); Aitziber Sanchez Calvo, Oslo (NO)

(73) Assignee: AKER PROCESS SYSTEMS AS, Lysaker (NO)

( * ) Notice: Subject to any disclaimer, the term of this patent is extended or adjusted under 35 U.S.C. 154(b) by 220 days.

(21) Appl. No.: 14/366,411

(22) PCT Filed: Dec. 19, 2012

(86) PCT No.: PCT/IB2012/057464
§ 371 (c)(1),
(2) Date: Jun. 18, 2014

(87) PCT Pub. No.: WO2013/093789
PCT Pub. Date: Jun. 27, 2013

(65) Prior Publication Data
US 2015/0008190 A1    Jan. 8, 2015

Related U.S. Application Data

(60) Provisional application No. 61/579,860, filed on Dec. 23, 2011.

(51) Int. Cl.
*C02F 1/02* (2006.01)
*C02F 1/72* (2006.01)
(Continued)

(52) U.S. Cl.
CPC ............... *C02F 1/72* (2013.01); *C02F 1/025* (2013.01); *C02F 1/74* (2013.01); *E21B 37/06* (2013.01);
(Continued)

(58) Field of Classification Search
CPC .... C02F 1/02; C02F 1/025; C02F 1/72; C02F 1/722; C02F 1/725; C02F 1/727;
(Continued)

(56) References Cited

U.S. PATENT DOCUMENTS

| 6,340,373 B1 | 1/2002 | Billington |
| 7,994,374 B2 | 8/2011 | Talley et al. |

(Continued)

FOREIGN PATENT DOCUMENTS

| FR | 2 914 684 | 10/2008 |
| WO | 2010/084323 | 7/2010 |
| WO | 2012/128910 | 9/2012 |

OTHER PUBLICATIONS

International Search Report issued Nov. 7, 2013, in International (PCT) Application No. PCT/IB2012/057464.
(Continued)

*Primary Examiner* — Lucas Stelling
(74) *Attorney, Agent, or Firm* — Wenderoth, Lind & Ponack, L.L.P.

(57) ABSTRACT

A stream processing system, where the stream comprises a glycol based hydrate inhibitor and a kinetic hydrate inhibitor (KHI) is provided. The system comprises a thermal oxidation unit (31) and a processing unit comprising a stream inlet (9), a fluid inlet (11) and a mixture outlet (15) in fluid communication with the thermal oxidation unit.

22 Claims, 7 Drawing Sheets

(51) Int. Cl.
  *C02F 1/74* (2006.01)
  *E21B 21/06* (2006.01)
  *E21B 37/06* (2006.01)
  *E21B 43/34* (2006.01)
  *C02F 103/10* (2006.01)

(52) U.S. Cl.
  CPC .......... *E21B 43/34* (2013.01); *C02F 2103/10* (2013.01); *E21B 21/068* (2013.01)

(58) Field of Classification Search
  CPC .......... C02F 1/74; C02F 1/78; C02F 2103/10; E21B 43/34; E21B 37/06; E21B 37/062; E21B 37/063; E21B 37/068
  See application file for complete search history.

(56) References Cited

U.S. PATENT DOCUMENTS

2008/0312478 A1   12/2008   Talley et al.
2010/0252500 A1*  10/2010   Kumfer .................... C02F 1/66
                                                                     210/620

OTHER PUBLICATIONS

Written Opinion of the International Searching Authority issued Nov. 7, 2013, in International (PCT) Application No. PCT/IB2012/057464.

Brustad et al., "Hydrate Prevention using MEG instead of MeOH: Impact of experience from major Norwegian developments on technology selection for injection and recovery of MEG", Aker Kvaerner Engineering and Technology Copyright, May 2005, pp. 2-5.

Allenson et al., "Evaluation and Field Optimisation of Kinetic Hydrate Inhibitors for Application Within MEG Recovery Units, Gas Condensate Field, Mediterranean Sea", SPE International, SPE 127421, Feb. 2010, pp. 1-11.

* cited by examiner

METHOD AND SYSTEM FOR PROCESSING A STREAM COMPRISING GLYCOL BASED AND KINETIC HYDRATE INHIBITORS

This invention relates to a method and system for processing streams comprising mixtures of glycol based hydrate inhibitors and kinetic hydrate inhibitors (KHI), especially bottom streams, where the process comprises treating, storage and disposal of MEG bottoms.

BACKGROUND

During oil and gas exploitation a produced fluid containing crude oil and/or natural gas as well as water and other components are obtained from a well. This well stream is transported from the well to a processing site. When the composition, pressure or temperature of the produced fluid changes during transport, then solid hydrates may form. These solids can result in blockage of the pipelines and other equipment. To avoid this problem it is well know to add hydrate inhibitors to the produced fluid. Different types of inhibitors have previously been identified. A well know and often employed inhibitor are glycol based inhibitors such as mono ethylene glycol or other types of glycol with different substituents. Another group of inhibitors are kinetic inhibitors, where the name refers to the ability of the substance to influence the kinetic of the hydrate forming reactions so that these will proceed much slower than what would otherwise be the case.

Conventionally only one type of inhibitor is employed in a particular well stream. The inhibitor is selected based on the composition of the well stream, prevailing conditions and physical requirements.

The glycol based inhibitors have been employed for many years, and systems for separating and regenerating the glycol are also well known. The use of glycol inhibitors is accordingly a proven concept, but the concept also has limitations. For transporting well streams comprising considerable amounts of water and gas over long distances at low temperatures, the concentration of MEG or another glycol based inhibitor needed to avoid hydrate formation increase significantly. This result in the need of relatively large diameter pipelines all the way down to the well to supply the MEG. Increasing the MEG concentration also results in an increase in the total treated well stream to be transported from the well to the processing site.

In these situations it may be economically more attractive to limit the amount of glycol based inhibitor and instead add a kinetic inhibitor which generally needs to be added in small concentrations compared to the glycol based inhibitors to have a sufficient effect. During topside handling of the process fluid for instance prior to depressurization it may however be necessary to introduce additional inhibitor in addition to the kinetic inhibitor. As the distances topside are normally significantly smaller the use of glycol topside as such additional inhibitor is suitable due to its efficiency and well known methods for regeneration and reuse, which limits the need to handle environmental challenging waste streams.

In some cases it is also relevant to combine KHI and lean MEG as a common hydrate inhibitor in the well stream, reducing the necessary feed rates of MEG, and therefore also reducing the size of MEG recovery plant.

The traditional methods for regenerating the glycol based inhibitor for reuse are mainly based on evaporation of water and/or inhibitor and precipitating salts accumulated in the inhibitor stream and removing the solid salt particles. However when employing a kinetic inhibitor combined with the glycol based inhibitor the behavior of the streams, especially the salty glycol stream, changes and it has been identified that the presence of the kinetic inhibitor in the stream may result in formation of agglomerated matter, which again increases the risk of clogging of pipes and other equipment.

PRIOR ART

U.S. Pat. No. 7,994,374 disclose a method of treating a fluid having hydrate-forming constituents, where a mixture of glycol and one or more kinetic inhibitors are used for the treatment. The glycol and the one or more kinetic inhibitors are separated from the fluid together with an aqueous phase. For regaining the inhibitors the aqueous phase is heated and the water evaporated. For removal of salts that may accumulate in the recycle stream the patent refers to the U.S. Pat. No. 6,340,373 for a treatment.

U.S. Pat. No. 6,340,373 discloses a method of treatment and processing of an organic fluid comprising metal ions comprising a salt reduction and crystallization unit. According to this method the salts are precipitated as solid particles and the solid particles are removed through solid separation.

WO2010/084323 discloses process for production of lean hydrate inhibitor. The inhibitor is glycol, and the process disclosed for removal of salts involves conventional reclamation where the salts a precipitated and separated through solid separation techniques.

WO2012/128910 published 27 Sep. 2012 discloses a method for degrading KHI involving ozonation and Fenton's process. Stating that heating, incineration or other attempts simply produce more waste.

DESCRIPTION OF THE INVENTION

The aim of the present invention is to provide a method and a system applicable for processing a stream, where the stream comprises mainly glycol based hydrate inhibitor, accumulated salts and accumulated kinetic inhibitor.

The stream may be a bottom stream from a glycol inhibitor regeneration system.

Another aim is to provide an environmental and economically efficient way of handling and disposing a stream comprising salts, glycol based hydrate inhibitor and kinetic inhibitor.

It is also a goal to provide an alternative method for handling a bled stream from a glycol based hydrate inhibitor regeneration process also comprising KHI, where the bled stream is adjusted to limit the accumulation of salts in the regenerated inhibitor.

Another goal is to provide a method and system applicable to obtain lean glycol which no or limited amounts of KHI. Accordingly the system should process and remove an amount of KHI equivalent to the amount of KHI added upstream. This is relevant for example where the KHI is added to the well stream further upstream than the regenerated glycol is added and where an inadequate removal of KHI would result in an accumulation of increasing amounts of KHI in the glycol. Another example is a situation where combined hydrate inhibitor of MEG and KHI are added as a mixture to the well stream, but where KHI need to be removed from the recovered MEG as the inhibiting properties thereof has been weakened.

The present invention provides a stream processing system, where the stream comprises a glycol based hydrate inhibitor and a kinetic hydrate inhibitor (KHI), wherein the stream processing system comprises a thermal oxidation unit and a processing unit comprising a stream inlet, a fluid inlet and a mixture outlet in fluid communication with the thermal oxidation unit. Accordingly the stream processing system is a system for handling a stream usually a bleed stream and optionally a bottom stream comprising a glycol based hydrate inhibitor and a kinetic hydrate inhibitor (KHI). The system comprises at least two main units, a processing unit and a thermal oxidation unit. Within the processing unit the stream is prepared for thermal oxidation, including controlled mixing with a fluid with limited or no formation of agglomerates. The fluid preferably comprises water and the fluid may be cooled in a cooler upstream the fluid inlet. The fluid may comprise other compounds depending on the source of the fluid. In one embodiment the fluid inlet is a water inlet.

The thermal oxidation unit is arranged downstream the processing unit

In a first aspect of the present invention the processing unit comprises a circulation loop with an inline mixing unit or section comprising the stream inlet, a circulation stream inlet and a circulation stream outlet, wherein the fluid inlet and the mixture outlet are in fluid communication with the circulation loop. In another aspect the circulation loop further comprises an inline tank, an inline pump and an inline cooler. In one embodiment of this aspect the mixing unit is arranged upstream the tank which is arranged upstream the pump, which is arranged upstream the inline cooler.

In a further aspect of the present invention the mixture outlet is in fluid communication with the circulation loop downstream the inline cooler.

In a second embodiment of the first aspect of the present invention the circulation loop further comprises an inline tank downstream of the mixing unit, an inline pump downstream the inline tank, wherein the fluid inlet is in fluid communication with the inline tank, and wherein the system further comprises a cooling unit with an inlet in fluid communication with the circulation loop downstream the inline pump and an outlet in fluid communication with the inline tank.

In a third embodiment of the first aspect of the present invention the mixing unit is an inline tank where the water inlet is in fluid communication with the inline tank, and an inline pump and an inline cooler are arranged in the circulation loop downstream the inline tank.

In a second aspect of the present invention the processing unit comprises a cooled, agitated tank, and a pump downstream the mixture outlet.

In a further aspect of the present invention, especially in a first aspect thereof the system further comprises a parallel cleaning loop comprising an inline cleaning tank, an inline cleaning pump and an inline cleaning cooler, where the cleaning loop comprises an cleaning loop inlet in fluid communication with the circulation loop through a first normally closed valve downstream the fluid inlet, a cleaning loop outlet in fluid communication through a second normally closed valve upstream the mixing unit, and a cleaning fluid inlet in fluid communication with the cleaning loop.

Further the present invention provides a method for processing a stream comprising a glycol based hydrate inhibitor and a kinetic hydrate inhibitor (KHI), wherein the method comprises mixing the stream with water in a processing unit, and thermally oxidising the obtained mixture.

The stream comprising a glycol based hydrate inhibitor and a kinetic hydrate inhibitor (KHI) may in one embodiment be a bottom stream from a system for regeneration of glycol based hydrate inhibitor.

In one aspect of the present invention the mixing is performed by adding said stream such as a bottom stream to a preformed mixture of water and said stream, and where the preformed mixture of water and stream is cooled before the additional stream is added.

In a further aspect of the method the water has a temperature lower than the temperature of the stream comprising glycol based hydrate inhibitor and kinetic hydrate inhibitor (KHI).

In another aspect of the method according to the present invention the method comprises circulating the preformed mixture in a circulation loop, wherein water is added to the circulating stream prior to the cooling and a part of the circulating stream is diverted to be thermally oxidised.

In yet another aspect of the invention the cooling is performed by redirecting a part of the circulating stream through a cooler and returning the cooled stream to the circulating stream.

In a further aspect of the method the temperature of the resulting mixture is kept below 25° C. Here the temperature is the temperature of the mixture after the mixing is completed.

In an even further aspect of the method the instantaneous temperature of the mixture when being mixed is kept below 45° C. The term "instantaneous temperature" as used here refers to the temperature of the stream as it is brought in contact water before the mixture of the streams is completed. The water can according to the invention be a water stream or water comprised in a preformed mixture of stream and water.

In a different aspect the method according to the present invention further comprises passing a cleaning fluid through the processing unit. This further process can be performed at regular intervals and/or after determination of the presence of precipitates within the processing unit.

The following terms and expressions as used herein shall have the meaning below unless otherwise indicated.

The term "KHI" is used for Kinetic Hydrate Inhibitors and refers to any compound or compounds retarding gas hydrates by functioning as anti nucleates. Accordingly these compounds retard the formation rate of gas hydrates by slowing down the growth and nucleation rates. A large number of polymers are known for providing this effect, such as poly(N-vinyl-2-pyrrolidone) (PVP), poly[vinyl-methyl-acetamide/vinyl-caprolactam] (poly[VIMA/VCAP]). As used here the term KHI refers to any such polymers or combination of polymers added to well streams to provide kinetic hydrate inhibition. Other examples of KHIs are disclosed in WO2011/130370, and publications referred to therein. The term KHI shall also include non-polymeric substances with higher boiling point than MEG.

The term "glycol regeneration unit" as used herein means a system which regenerates glycol by distillation at atmospheric pressure or by reclamation and distillation at vacuum pressure, by distillation at atmospheric pressure combined with reclamation at vacuum pressure or a combination of such methods. The term "glycol" or "glycol based" hydrate inhibitor refers to such as mono ethylene glycol (MEG), di ethylene glycol (DEG), tri ethylene glycol (TEG) as well as glycol with other substituents or mixtures thereof. Preferably the glycol is mono ethylene glycol.

The term "rich glycol" as used herein means glycol which has been used as anti hydrate forming agent in process fluids, and which is loaded with water and other contaminants including salts which need to be removed before being fit to reuse as anti hydrate forming agent The term "lean glycol" as used herein means sufficiently pure glycol to be employed as anti-hydrate forming agent in process fluids.

The term "inline" as used herein in connection loops refer to process units having both an inlet and an outlet to the loop.

The present invention is based on the realisation of the resulting problem when processing MEG and KHI in a MEG regeneration plant with the main aim of separating the KHI entirely from MEG. In one aspect of the invention the produced water is re-injected through an injection well.

Thus, in another aspect, the present invention relates to a method for handling, storage and disposal of the mixture of MEG, KHI and salts which is bled off from the system in a safely, economically and environmentally way.

BRIEF DESCRIPTION OF THE DRAWINGS

The present invention will be discussed in further detail with reference to the enclosed figures where.

The provided figures are only schematic illustrations of the lay out of the processes, and are kept at a limited level of details to better present the main elements of the present invention. A person skilled in the art will understand the function of the different units.

PRINCIPAL DESCRIPTION OF THE INVENTION

Figure 1:
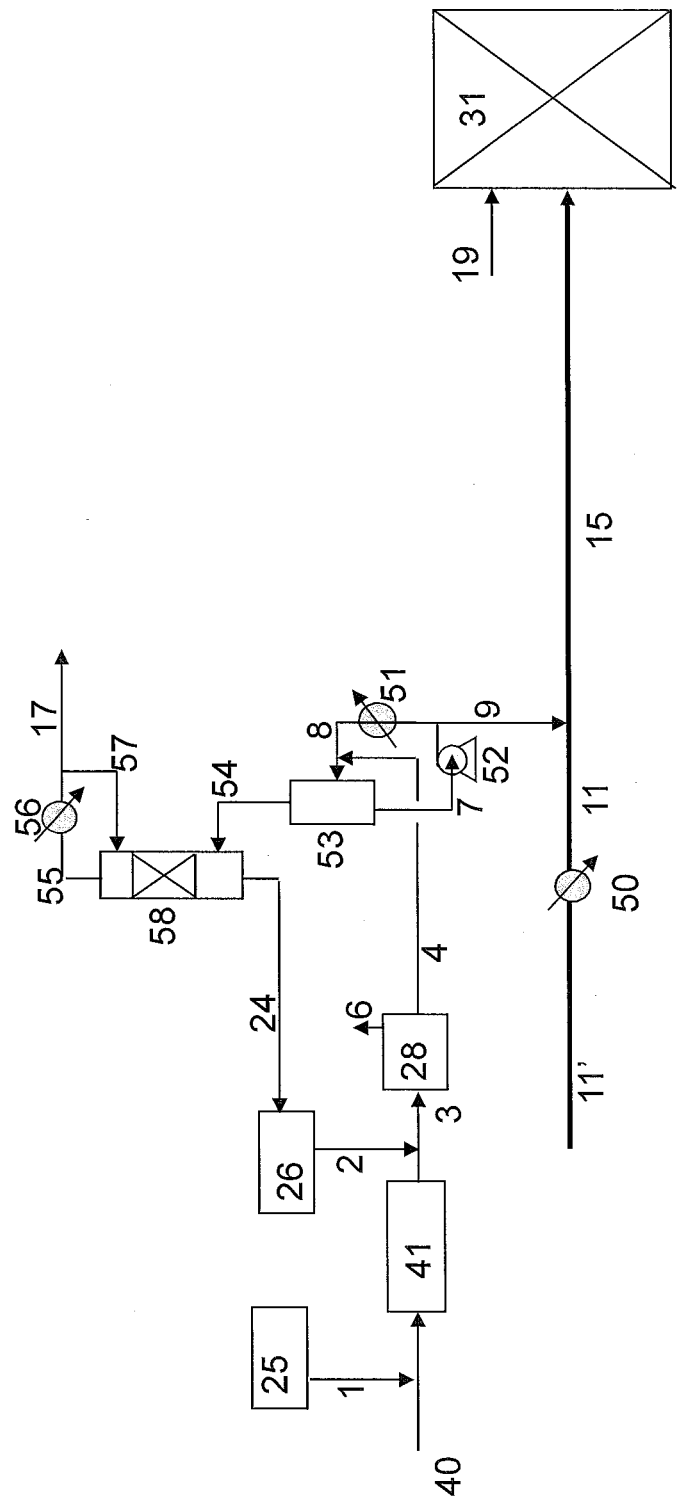
FIG. 1: Illustrates schematically a first embodiment of the present invention.

A first embodiment of the present invention is illustrated on FIG. 1. Here a well stream 40 is initially treated with a KHI stream 1 from a KHI storage tank 25. This initial treatment to avoid formation of gas hydrates takes place near the well head, where the well stream is first obtained. The treated stream passes through unit 41, before being mixed with glycol from the glycol tank 26 via line 2. The unit 41 may be a transport pipeline or it may additional be other well stream treatment units normally installed upstream a slug catcher and or a depressurization of the well stream. The obtained mixture of the well stream, KHI and glycol 3 is fed to a slug catcher, depressurization, degasser, separation unit 28. Although illustrated as one unit this may be a number of interconnected units resulting in rich glycol stream 4 which is an aqueous stream comprising primarily produced water, glycol, salts and KHI, but also other water solvable compounds will often be included in this stream. Such compounds can be corrosion products, added corrosion inhibitors, well treatment fluids, solvents used for adding different compounds including KHI etc. The produced hydrocarbons leave the system as stream 6 for further treatment. The aqueous stream 4 is fed to a return stream 8 of a boiler loop of an evaporator 53. The boiler loop comprises a bottom stream 7 from the evaporator 53 which is past via a pump 52 and a heater 51 before entering the evaporator 53. Within the evaporator water and glycol is evaporated. Preferably vacuum condition is applied in the evaporation process enabling MEG to evaporate at lower temperatures. The added KHI has a higher boiling point than water and glycol and will therefore generally not follow the vapour phase 54 leaving the evaporator. For separation of the water from the glycol the vapour 54 is fed to a distillation column 58. Water vapour 55 leaving over the top of the distillation column 58 is cooled in cooler 56 and condensed. To increase the efficiency of the distillation, a portion of the condensed water 57 is recycled to the distillation column 58. The rest leaves system as produced water 17. From the bottom of the distillation column 58 lean glycol stream 24 is obtained and recycled to the lean glycol tank 26 for reuse.

To avoid the accumulation of KHI, salts and other compounds with a higher boiling point than water and glycol, a bleed stream 9 is removed from the boiler loop. It is the further handling of this stream 9 which is one of the main issues of the present invention. In this first embodiment of the present invention the stream is mixed with water 11. Depending on the prevailing conditions the water is cooled by cooler 50 before the mixing with the bleed stream. The bleed stream is generally warm with a temperature of between 80-120° C., often approximately 100° C. The mixture should to avoid the formation of solid agglomerates not reach a temperature of over 55° C., preferably instantaneous temperature within the mixture should be less than 50° C., even more preferably be less than 45° C. After the mixing is completed, the temperature of the stream 15 should not exceed 35° C., preferably 30° C. and even more preferably it should not exceed 25° C. The stream 15 is fed to a thermal oxidizer system (TOS) 31. Also fuel, air and optionally additional water, stream 19, is also fed to the TOS 31. If solid agglomerates had been allowed to form, these would generate sticky lumps upsetting further processing and handling of the bottom products, such as processing the bottom product as in this preferred embodiment in the TOS 31.

Thermal oxidation is per se a well known concept of treating waste streams containing organic material, but not for disposal of bottom products from a MEG recovery process comprising used KHI. The combustion of the added fuel provides the heat necessary to perform the oxidation/combustion of the organic compounds. The present system the glycol and KHI are combusted. The thermal oxidation system may comprise a scrubber section to clean the exhaust gas prior to release to the atmosphere.

Figure 2:
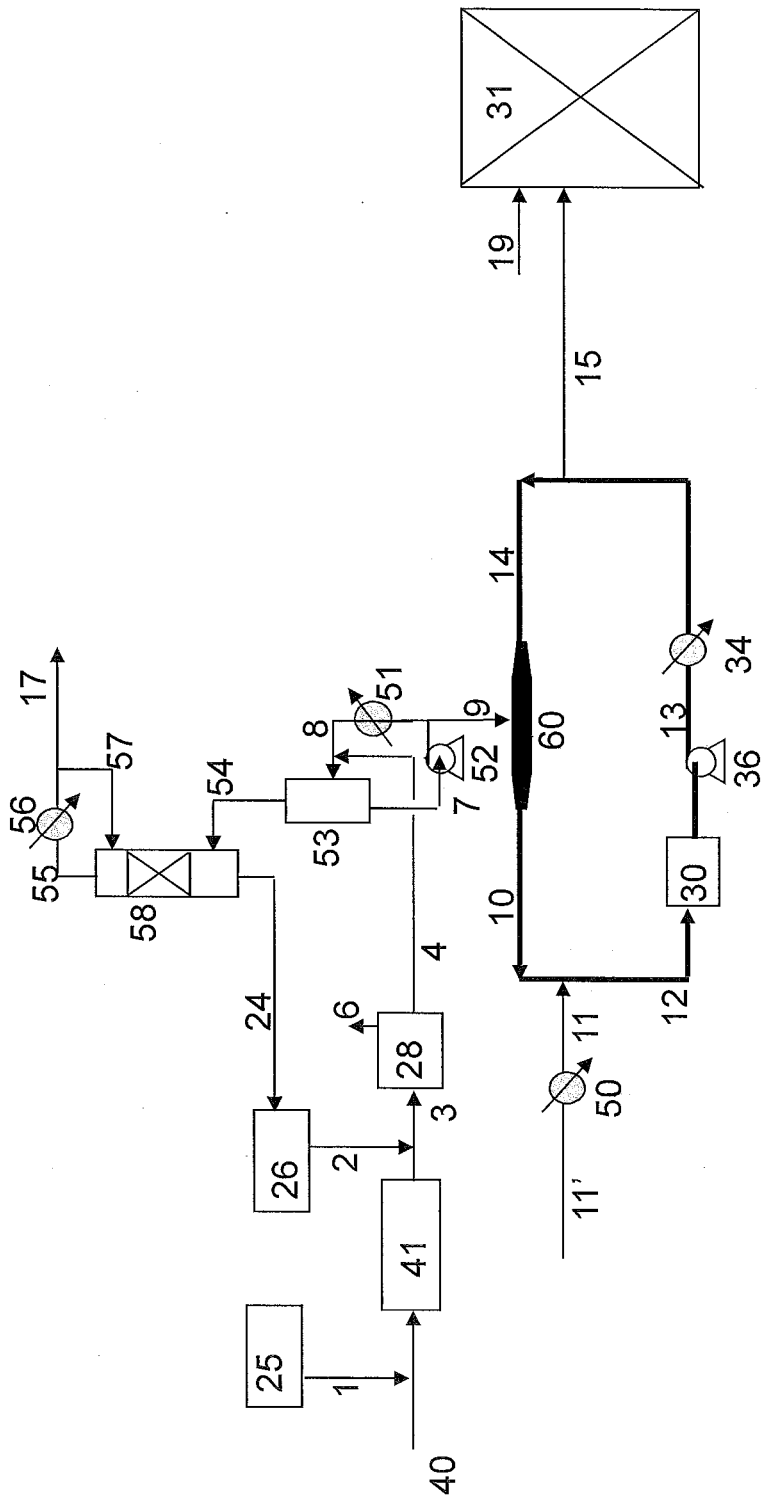
FIG. 2: Illustrates a second embodiment of the present invention.

FIG. 2 illustrates a second embodiment of the present invention. The initial system including the glycol regeneration is unchanged, but the treatment of the bleed stream has changed. In the first embodiment huge considerable amounts of fresh feed water is used 11' and all the fed water most be treated in the TOS. In the embodiment on FIG. 2 the amount of feed water 11 is reduced by installing a recycle loop. The bleed stream 9 is mixed with the stream 14. Her the mixing takes place within a mixing unit 60 which can be a pipe with unchanged or increase diameter or other equipment to increase the immediate mixing of the two streams to avoid high temperatures as discussed in connection with FIG. 1. Water 11 is added to the mixture stream 10 if necessary to obtain an acceptable concentration of the different components. If cooled the water 11 will provide additional temperature regulation. The obtained mixture is fed via line 12 to a tank 30. A pump 36 transports the mixture 13 through a cooler 34, which provides a significant part of the cooling to the system. The cooler 34 generates the stream 14 for mixing with the bleed stream. A stream 15 is split of from the stream 14 and past to the TOS as described above.

Figure 3:
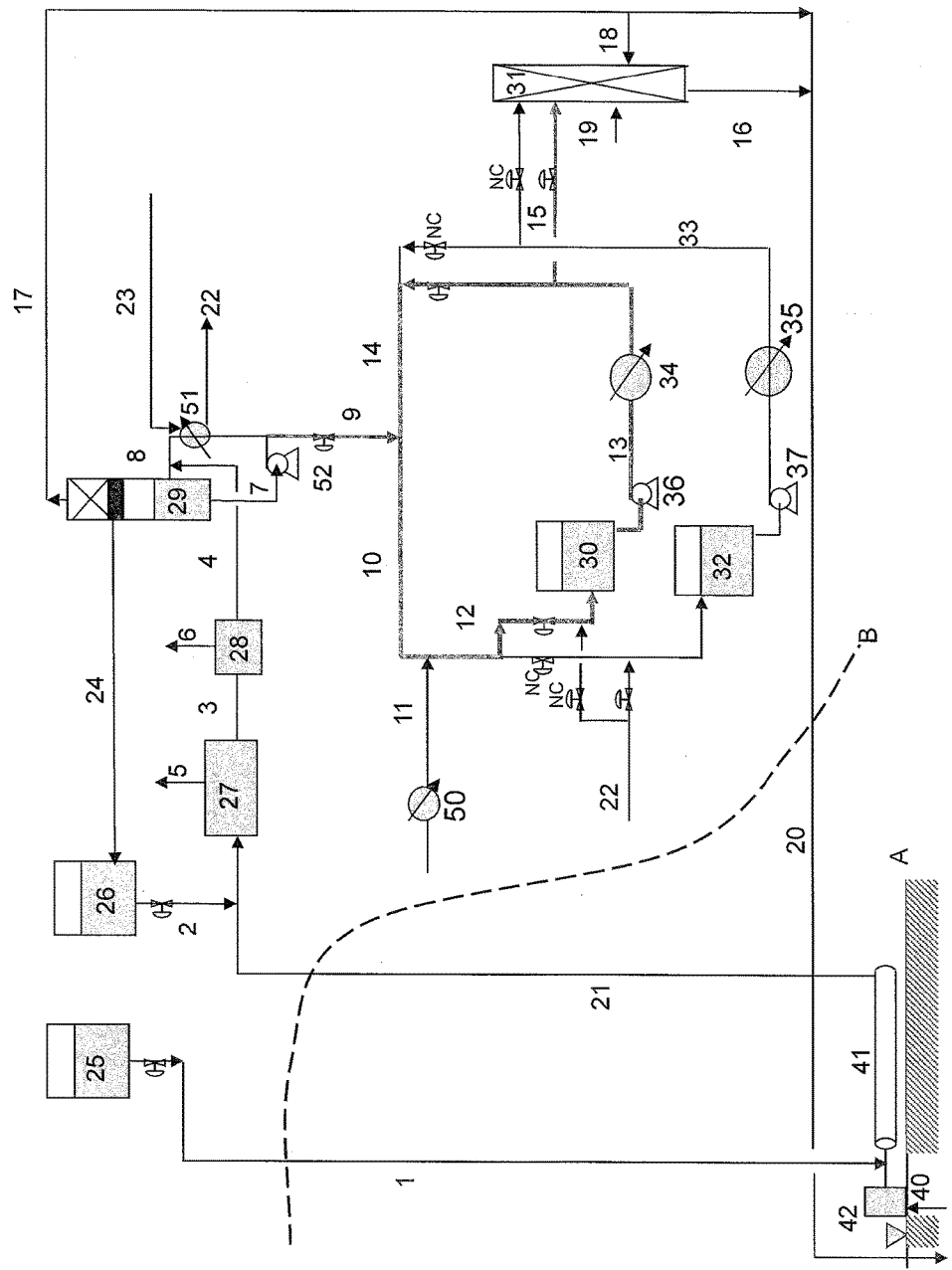
FIG. 3: Illustrates the second embodiment of the present invention in further detail including a cleaning process system.

FIG. 3 illustrates schematically the whole system of the second embodiment. Here MEG is selected as the glycol and the KHI is soled in butyl glycol. The embodiment is exemplified in detail by describing the conditions with respect to this specific use of the system. The figure shows the system from the wells with the injection of KHI and the MEG regeneration unit, and final disposal of the MEG bottoms into the oxidizer and final reinjection of water free of KHI back into the wells 42.

KHI 1 using butyl glycol as solvent is injected in the wells 40 in order to avoid hydrants formation. A mixture of hydrocarbons, water and dissolved salts are extracted from the oil and gas reservoir 40, and transported subsea (marked with A) in pipeline 41 before taken topside (past the line B). After recovering the desired hydrocarbons products, the two phase flow is sent to a slug catcher 27 where the pressure is taken down, dropping the temperature of the mixture, stream 5 is produced gas being removed. During winter time due to colder seawater temperatures, MEG 2 is required to be injected before entering the slug catcher in order to avoid further hydrates formation. At this point the feed stream 3 containing; KHI, butyl glycol, MEG, divalent and monovalent salts and water, is called rich MEG.

The full rich MEG flow 3 enters a degasser 28 where by decreasing the pressure the light hydrocarbons and $CO_2$, stream 6 are flashed off and routed to a flare header (not shown), the liquid phase 4 is fed into the vacuum reclaimer 29 which consists of the MEG flash separator and a heated recycle loop, where the rich MEG is boiled under vacuum. The vacuum system, condensing of evaporated water and condensed water reflux to distillatory is for purpose of better overall illustration not shown. The vapour phase from the flash separator is routed directly to the reconcentrator distillation unit, the top part of 29, where the MEG/water mixture is distilled out on the packed media, where the water vapour 17 exits the distillation column as the top product and the lean MEG product 24 leaves the column below the packed media, being routed to the lean MEG storage tank 26 ready for being re-injected.

The liquid phase in the flash separator contains dissolved ions precipitated salts, KHI and almost pure MEG; the salt ions are up concentrated and crystallized. Due to the presence of KHI and its accumulation in the recycle loop 7, 8 it will have to be drained out from the system. The KHI and other bottom products are drained off at a specific rate so the concentration of divalent cations does not reach sufficient high levels to cause severe scaling problems on the recycle heater 51. The recycle heater 51 is preferably a spiral heat exchanger. The KHI/Cl and dissolved and precipitated salts concentration in the recycle loop is preferably kept below 10 wt % more preferably at approximately 8.5 wt % in order to avoid the formation of a salt-MEG complex and control the viscosity. This concentration corresponds to a viscosity in the reclaimer of approximately 20-25 cP. Continuous bleed off 9 from the recycle loop is therefore required to avoid to high viscosity. Density is on average approximately 1400 kg/m³ with 24% salt content at operating temperature.

The final disposal treatment selected as feasible for managing the bleed mixture is an oxidizer 31 specialized on MEG brine waste combustion. This system established the MEG bottoms handling unit design.

Due to the presence of salts and compounds that have bound nitrogen, it is necessary to dilute the waste stream to around 50 wt %, otherwise the temperature reached in the oxidizer would be too high, exceeding 1200° C. compromising the long term operation of the oxidizer.

The bleed 9 leaves the recycle loop at a temperature of around 100° C., maximum 120° C., due to the nature of the mixture, it solidifies as it cools down, hence due to the risk of clogging, a heat tracing system should be provided to keep the stream 9 warm until it is tied up to the main cold loop 10.

The main loop 10 is designed to pick the bleeds from different trains (if any). Due to the need of cutting the concentration with 50 wt % water prior to entering the oxidizer 31, as well as the nature of the bleed, high temperature and high viscosity, the dilution of the bleed is done in the loop. The behaviour of the KHI and water determines the temperature of the system. The new design's aim is to keep the temperature of the resulting mixed below 25° C.; taking into consideration that the instantaneous mixed temperature should not exceed 45° C. to avoid totally formation of lumps. The flow of the loop is determined by the flow of hot bleed which will be collected and the increasing in temperature allowed. The starting temperature of the loop is around 15° C. in order to absorb the heat coming from the bleed. And storage/accumulation tank 30 is established to assurance constant flow through the loop. The temperature in the tank is around 25° C., the pump transports the flow through the cooler 34 where the temperature drops down to 15° C. (10° C. difference allowance). The addition of the dilution water 11 is done at 15° C. A take off stream 15 from the cold loop is routed to the oxidiser.

A portion 18 of the water 17 from the distillation is utilized for scrubbing the exhaust from the TOS. The rich washing water 16 is combined with the rest of the water 17 and reinjected in a subsea well 42 to retain the well pressure.

Further illustrated on FIG. 3 is a possible solution for the cleaning of the system.

Cycles of Citric Acid, Water and Butyl Glycol 23 is used for cleaning the MEG regeneration plant. The liquid is first used for cleaning the boiler 51 leaving as stream 22, where after it is transferred to enter the system though entry 22. The normally closed (NC) valves allows for circulation of the cleaning liquid through one of the parallel systems 30, 36, 13, 34 and 32, 37, 35, 33 while the other contains the bleed stream mixture. By changing the valves the cleaning of the other system can be performed. After the cleaning the cleaning liquids can be collected separately and storage prior to burning them in the oxidizer as well. After running some experiments it is concluded that the citric acid and the KHI must be kept apart due to the reactions taking place when they are mixed, in which chemical reaction will create instant formation of solid sticky lumps of KHI, causing problems for the overall system. Therefore an independent piping network should preferably be implemented, routing the fluids 33 from the storage tank 32 to the oxidiser 31. It must be considered to have a cooler 35 to be able to cool the cleaning liquids down to 25° C., due to the possibility of KHI being carried over during the cleaning process.

Figure 4:
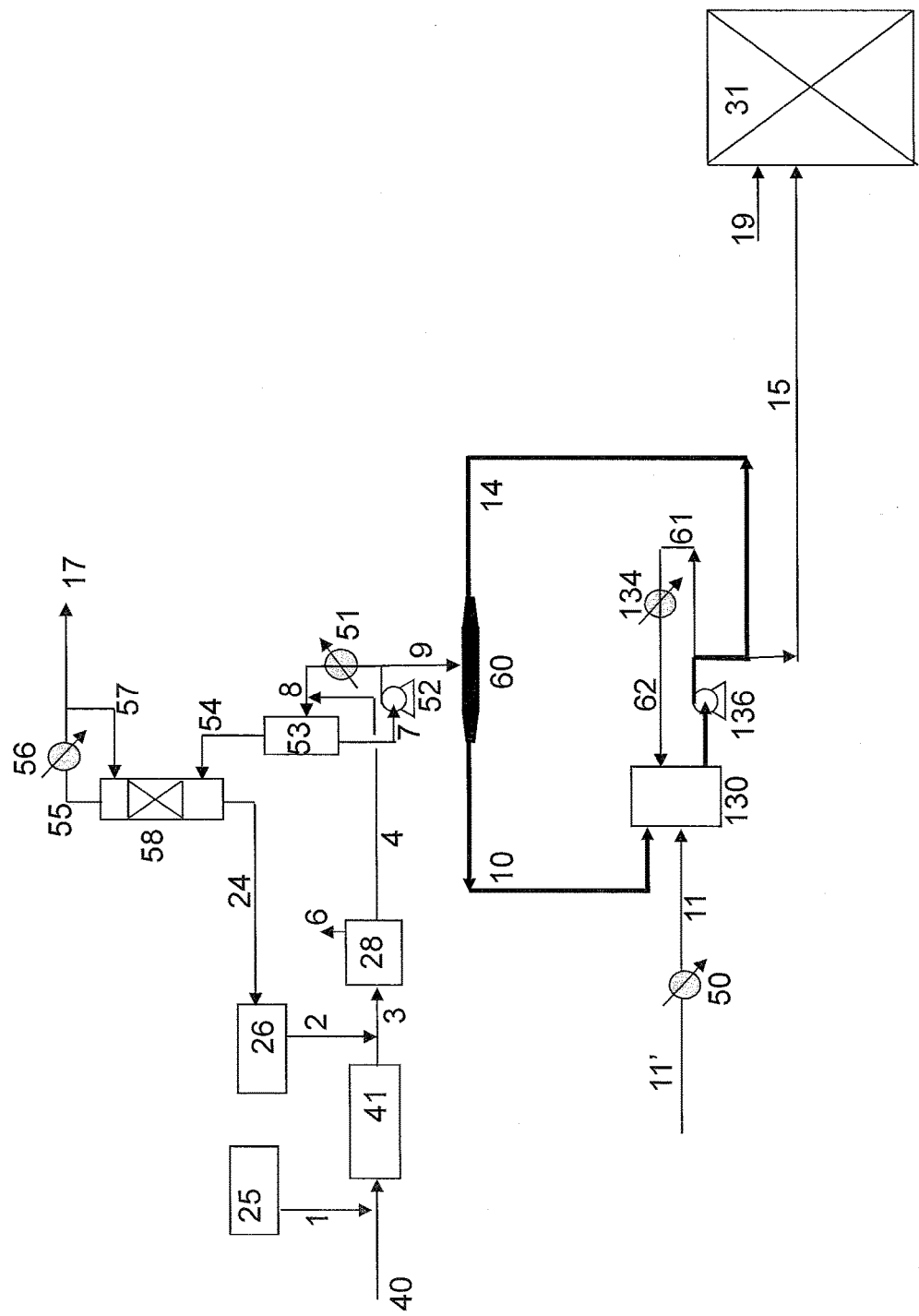
FIG. 4: Illustrates a third embodiment of the present invention.

The third embodiment illustrated on FIG. 4 is an alternative where the mixture 10 is fed to a tank 130. The outlet from the tank 130 goes to a pump 136 which does not only provide the circulation in the mixing loop but also feeds a cooling loop 61-62 via cooler 134. This embodiment enables a possible better control of the temperature in the tank 130 by a separate cooling recycle flow 61-62, and the size of the cooler can be reduced as only a slip stream is taken of the total flow.

Figure 5:
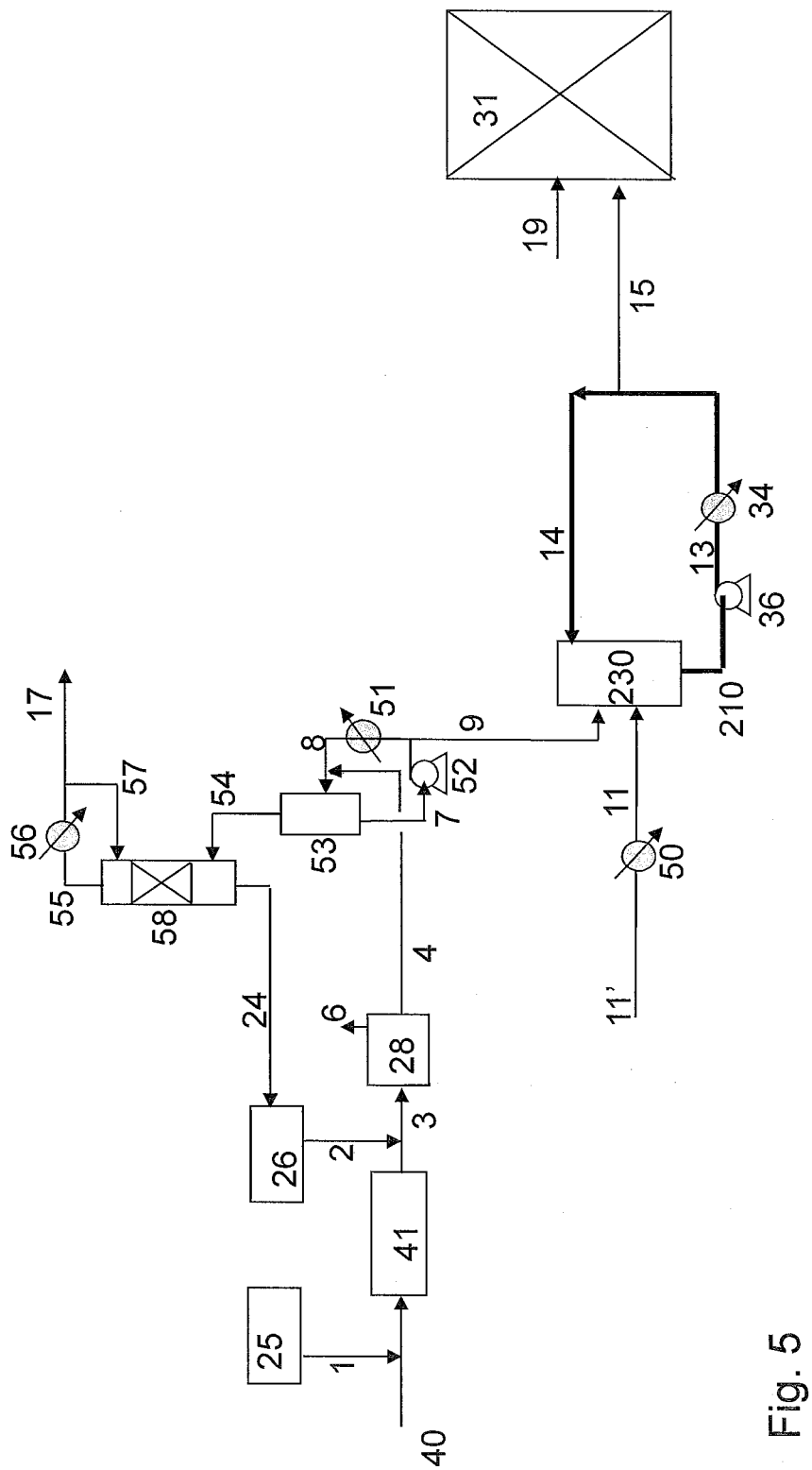
FIG. 5: Illustrates a fourth embodiment of the present invention.

In the fourth embodiment on FIG. 5 the tank and the mixing unit have been combined into one unit 230, the mixture stream 210 from the tank is fed to the pump 36.

Figure 6:
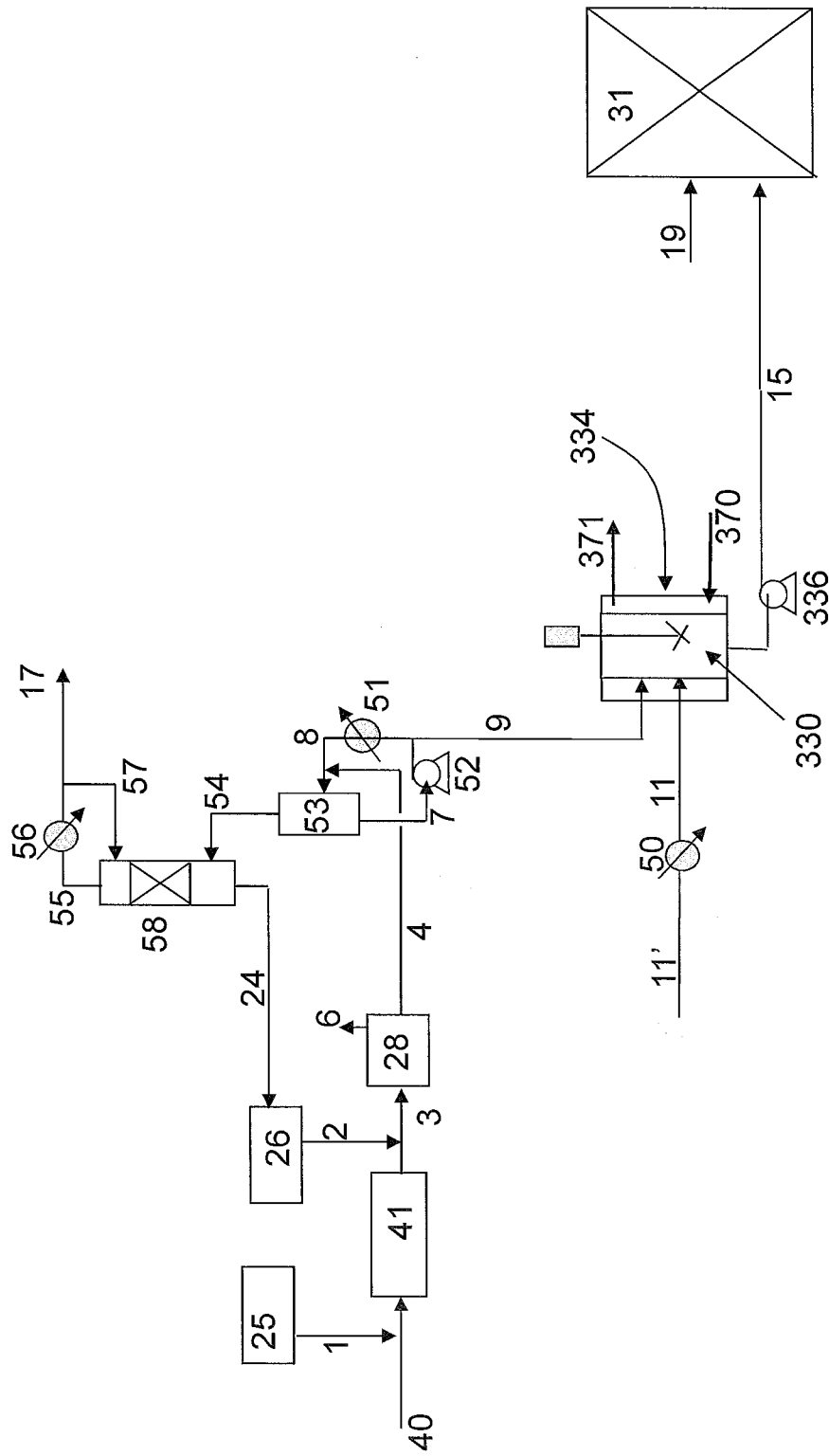
FIG. 6: illustrates a fifth embodiment of the present invention.

FIG. 6 illustrates an embodiment where the cooling as been moved to be included in a cooling mantle 334 arranged around the tank 330. Cooling medium is circulated through the mantle via inlet 370 and outlet 371. The mixture obtained in the tank is fed to the pump 336. A mixing device may be included to secure that the temperature is equalized within the tank 330.

Figure 7:
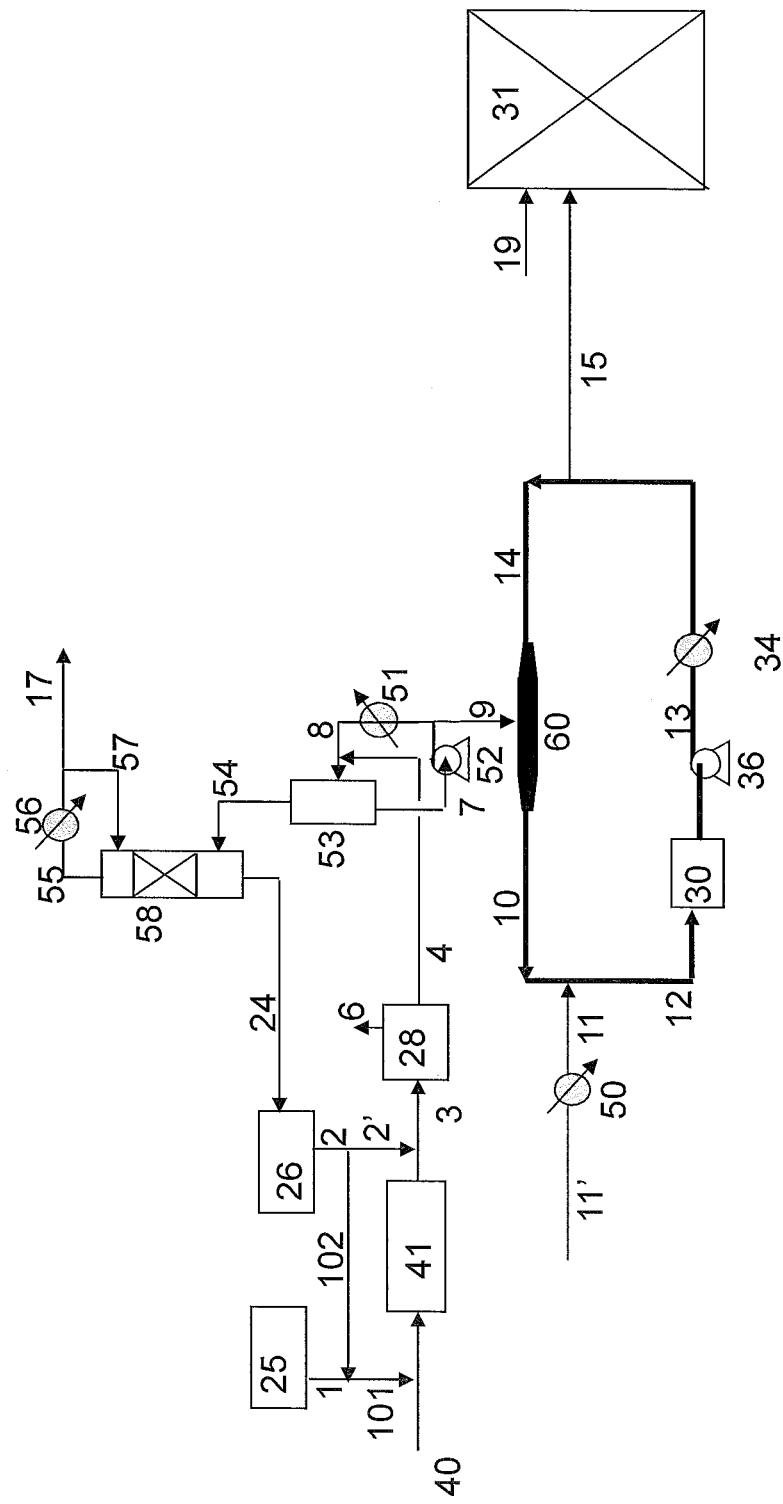
FIG. 7: illustrates a sixth embodiment of the present invention.

FIG. 7 illustrates an embodiment where combined glycol based hydrate inhibitor such as MEG and KHI are added as a mixture 101 to the well stream, limiting the necessary MEG concentration compared when no KHI is used. The mixture is obtained by mixing at least a part 102 of the glycol based inhibitor with the KHI stream 1. KHI still needs to be removed from the recovered MEG as the inhibiting property of the KHI becomes weakened when used. Thus the combined hydrate inhibitor 101 after injected into well stream is processed the same way as the MEG and KHI from as any of one of the preceding FIGS. 1-6. This figure also illustrates the option to add an extra portion 2' of lean MEG to the well stream after the depressurization in step 41.

In another embodiment the invention the fluid from line 4 in any of the preceding figures is pre-treated to precipitate, and optionally also remove, divalent salt ions upstream the evaporator 53, where typical means for pre-treatment used for conventional pre-treatment such as adjusting pH, alkalinity, temperature, pressure and use of separators etc can be utilized.

The invention claimed is:

1. A stream processing system, comprising:
a processing unit comprising a stream inlet fluidly connected to a source of glycol based hydrate inhibitor and kinetic hydrate inhibitor (KHI) provided as a stream, a fluid inlet fluidly connected to a source of fluid comprising water, and a mixture outlet, wherein the processing unit mixes the stream and the fluid providing a mixture; and
a thermal oxidizer comprising one or more inlets(s) fluidly connected to sources of fuel and air, the mixture outlet of the processing unit is in fluid communication with the thermal oxidizer, wherein the thermal oxidizer combusts the glycol based hydrate inhibitor and the kinetic hydrate inhibitor in the mixture.

2. The streaming processing system according to claim 1, wherein the processing unit comprises a fluid cooler upstream said fluid inlet.

3. The streaming processing system according to claim 1, wherein the processing unit comprises a circulation loop with an inline mixer or a section comprising the stream inlet, a circulation stream inlet and a circulation stream outlet, wherein the fluid inlet and the mixture outlet are in fluid communication with the circulation loop.

4. The streaming processing system according to claim 3, wherein the circulation loop further comprises an inline tank, an inline pump and an inline cooler.

5. The streaming processing system according to claim 4, wherein the inline mixer is arranged upstream the tank which is arranged upstream the pump, which is arranged upstream the inline cooler.

6. The streaming processing system according to claim 5, wherein the mixture outlet is in fluid communication with the circulation loop downstream the inline cooler.

7. The streaming processing system according to claim 3, wherein the circulation loop further comprises an inline tank downstream of the inline mixer, an inline pump downstream the inline tank, wherein the fluid inlet is in fluid communication with the inline tank, and wherein the system further comprises a cooling unit with an inlet in fluid communication with the circulation loop downstream the inline pump and an outlet in fluid communication with the inline tank.

8. The streaming processing system according to claim 3, wherein the inline mixer is an inline tank where the fluid inlet is in fluid communication with the inline tank, and an inline pump and an inline cooler are arranged in the circulation loop downstream the inline tank.

9. The streaming processing system according to claim 1, wherein the processing unit comprises a cooled, agitated tank, and a pump downstream the mixture outlet.

10. The streaming processing system according to claim 3, wherein the system further comprises a parallel cleaning loop comprising an inline cleaning tank, an inline cleaning pump and an inline cleaning cooler, where the cleaning loop comprises an cleaning loop inlet in fluid communication with the circulation loop through a first normally closed valve downstream the fluid inlet, a cleaning loop outlet in fluid communication through a second normally closed valve upstream the inline mixer, and a cleaning fluid inlet in fluid communication with the cleaning loop.

11. The streaming processing system according to claim 1, wherein the stream is a bleed stream.

12. The streaming processing system according to claim 11, wherein the bleed stream is a bottom stream.

13. A method for processing a stream comprising a glycol based hydrate inhibitor and, a kinetic hydrate inhibitor (KHI), wherein the method comprises mixing the stream with water in a processing unit, and thermally oxidising the obtained mixture.

14. The method according to claim 13, wherein the water has a temperature lower than the temperature of the stream comprising glycol based hydrate inhibitor and kinetic hydrate inhibitor (KHI).

15. The method according to claim 13, wherein the mixing is performed by adding the stream to a preformed mixture of water and stream, and where the preformed mixture of water and stream is cooled before the stream is added.

16. The method according to claim 15, wherein the method comprises circulating the preformed mixture in a circulation loop, wherein water is added to the circulating stream prior to the cooling and a part of the circulating stream is diverted to be thermally oxidised.

17. The method according to claim 15, wherein the cooling is performed by redirecting a part of the circulating stream through a cooler and returning the cooled stream to the circulating stream.

18. The method according to claim 13, wherein the temperature of the resulting mixture is kept below 25° C.

19. The method according to claim 13, wherein the instantaneous temperature of the mixture when being mixed is kept below 45° C.

20. The method according to claim 13, wherein the method further comprises passing a cleaning fluid through the processing unit.

21. The method according to claim 13, wherein the stream is a bleed stream.

22. The method according to claim 21, wherein the bleed stream is a bottom stream.

* * * * *